(12) United States Patent
Nolan et al.

(10) Patent No.: US 9,671,532 B1
(45) Date of Patent: Jun. 6, 2017

(54) SAFETY LIGHT REFLECTOR KIT

(71) Applicants: Jeff Nolan, Felton, CA (US); Chandra Kotarski, Brentwood, CA (US)

(72) Inventors: Jeff Nolan, Felton, CA (US); Chandra Kotarski, Brentwood, CA (US)

( * ) Notice: Subject to any disclaimer, the term of this patent is extended or adjusted under 35 U.S.C. 154(b) by 0 days.

(21) Appl. No.: 14/747,457

(22) Filed: Jun. 23, 2015

(51) Int. Cl.
*G02B 5/124* (2006.01)
*G02B 5/122* (2006.01)
*G02B 5/22* (2006.01)

(52) U.S. Cl.
CPC .............. *G02B 5/122* (2013.01); *G02B 5/22* (2013.01)

(58) Field of Classification Search
CPC ........ G02B 5/122; G02B 5/124; G02B 5/126; G02B 5/13; G02B 5/132; G02B 5/22
USPC ......................................... 359/515, 529–553
See application file for complete search history.

(56) References Cited

U.S. PATENT DOCUMENTS

| | | | |
|---|---|---|---|
| 2,281,565 A | 5/1942 | Eckel | |
| D207,930 S | 6/1967 | Kotler | |
| 3,712,706 A | 1/1973 | Stamm | |
| 3,820,852 A | 6/1974 | Kennedy | |
| 4,462,711 A | 7/1984 | Garner | |
| 4,889,409 A * | 12/1989 | Atcheson | G02B 5/126 359/534 |
| 6,200,064 B1 | 3/2001 | Hedgewick | |
| 6,514,006 B1 | 2/2003 | Hines | |
| 6,968,640 B2 | 11/2005 | Lee | |
| 2006/0198023 A1 | 9/2006 | Lee | |

* cited by examiner

*Primary Examiner* — James Phan

(57) ABSTRACT

The safety light reflector kit comprises a plurality of reflectors that can be configured in a number of shapes and reflective options depending on the needs of the assembler. The plurality of reflectors further comprises reflectors of one or more shapes and reflectors of a plurality of colors.

14 Claims, 3 Drawing Sheets

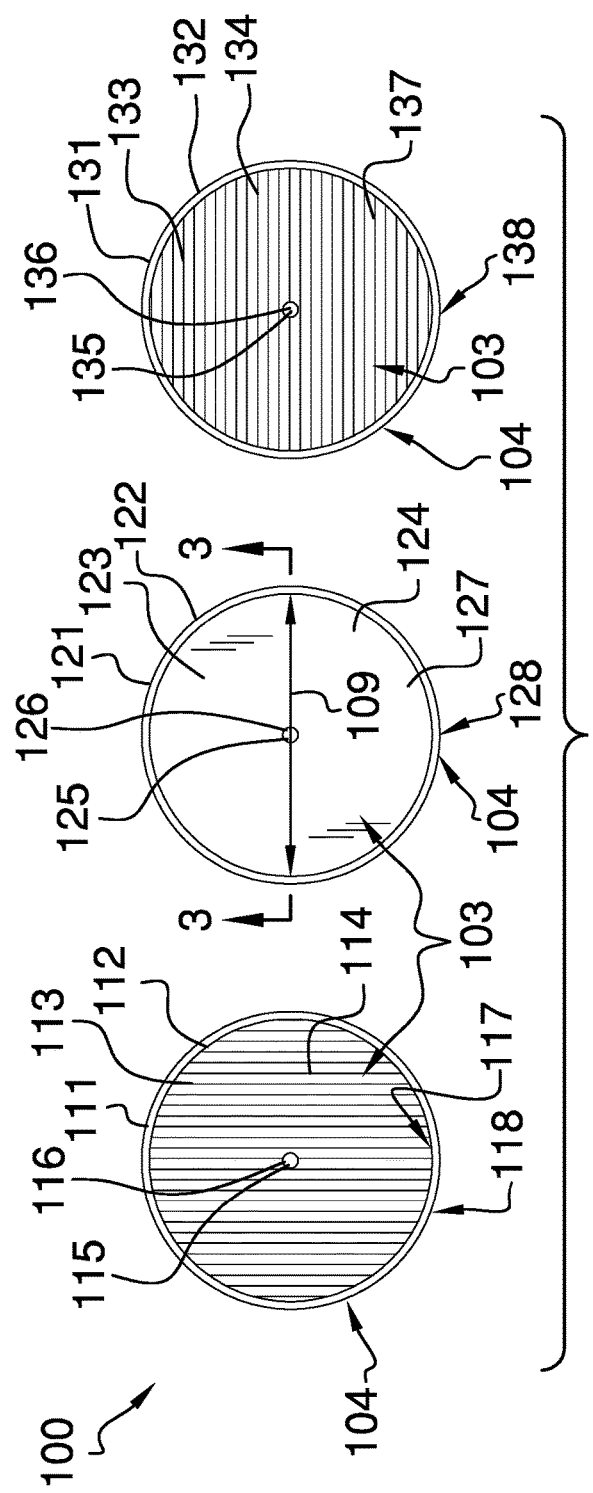
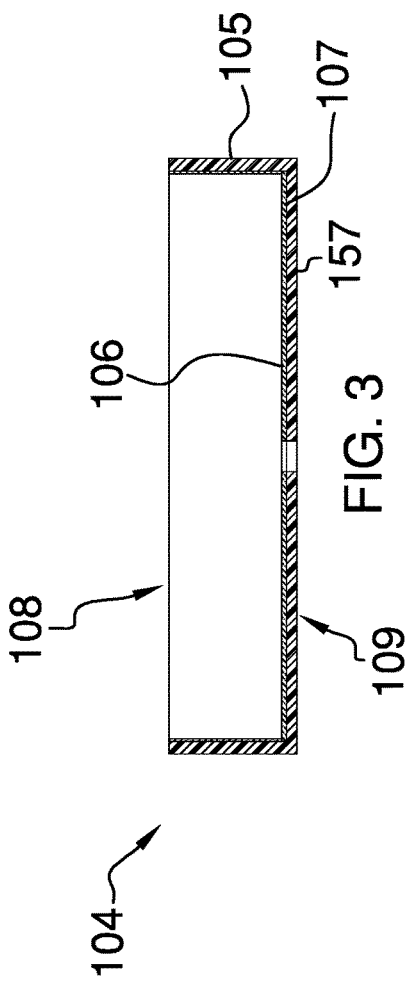
FIG. 2
FIG. 3

SAFETY LIGHT REFLECTOR KIT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of mirrors, reflectors, and illuminating devices, more specifically, a kit comprising a plurality of reflectors.

SUMMARY OF INVENTION

The safety light reflector kit comprises a plurality of reflectors that can be configured in a number of shapes and reflective options depending on the needs of the assembler. The plurality of reflectors further comprises reflectors of one or more shapes and reflectors of a plurality of colors.

These together with additional objects, features and advantages of the safety light reflector kit will be readily apparent to those of ordinary skill in the art upon reading the following detailed description of the presently preferred, but nonetheless illustrative, embodiments when taken in conjunction with the accompanying drawings.

In this respect, before explaining the current embodiments of the safety light reflector kit in detail, it is to be understood that the safety light reflector kit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the safety light reflector kit.

It is therefore important that the claims be regarded as including such equivalent construction insofar as they do not depart from the spirit and scope of the safety light reflector kit. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a top view of an embodiment of the disclosure.

FIG. 3 is a cross-sectional view of an embodiment of the disclosure across 3-3.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
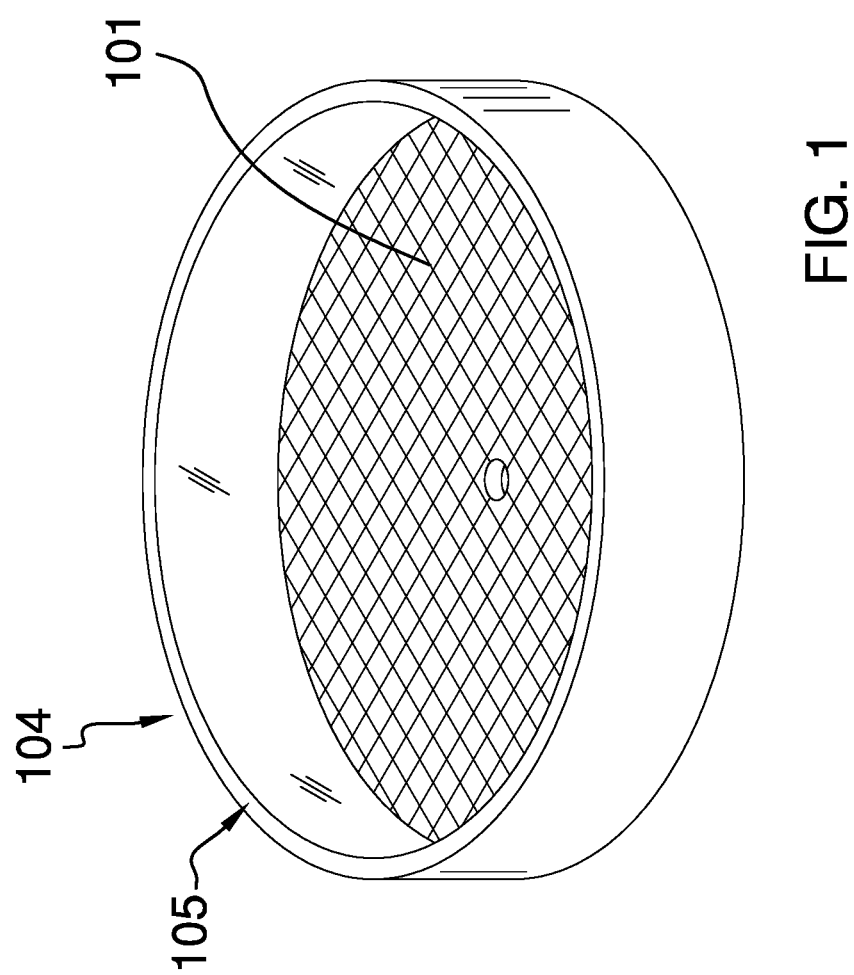
FIG. 1 is a perspective view of an embodiment of the disclosure.
Figure 4:
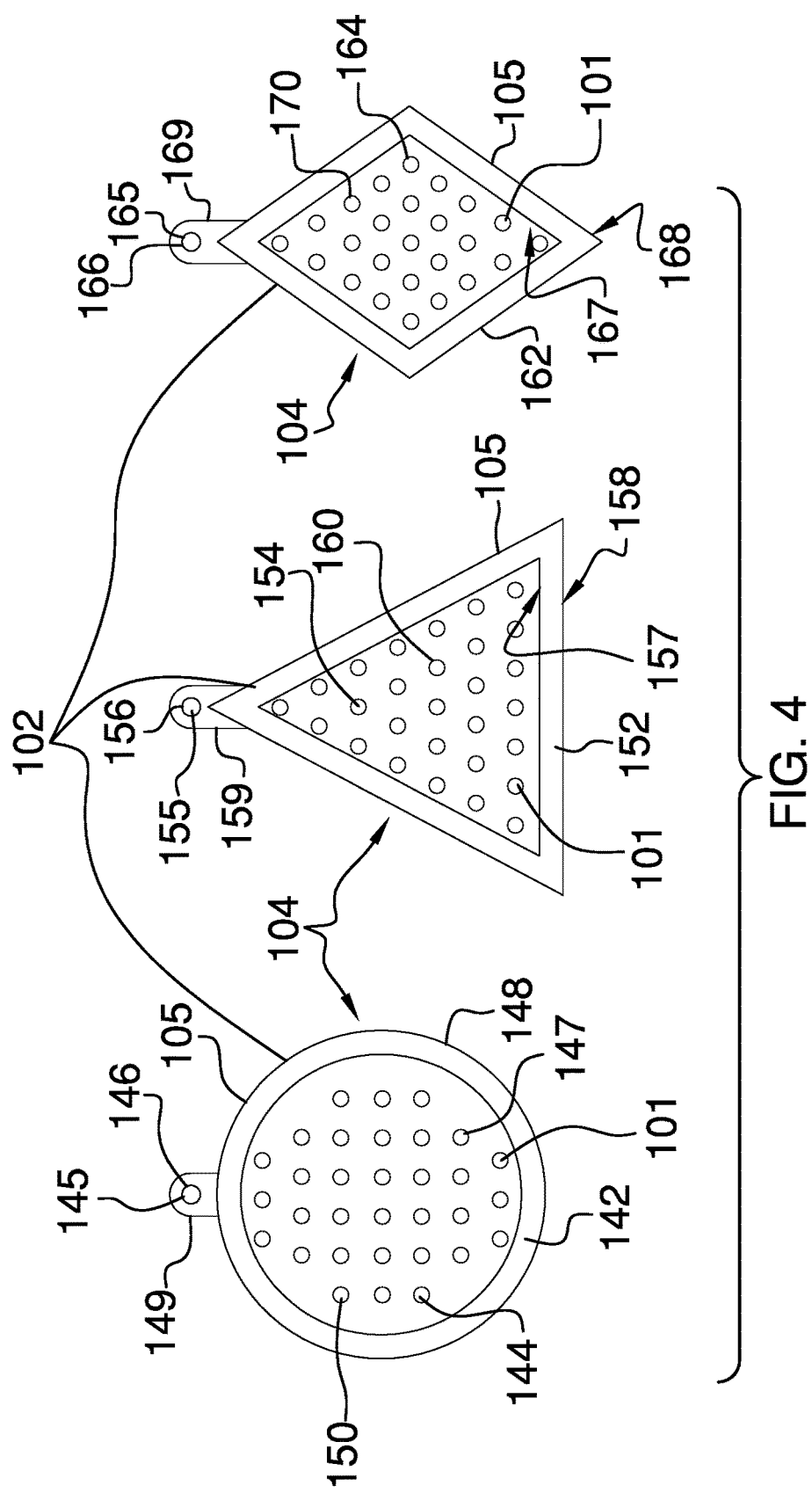
FIG. 4 is a top view of an embodiment of the disclosure.

Detailed reference will now be made to a first potential embodiment of the disclosure, which is illustrated in FIGS. 1 through 4. The safety light reflector kit 100 (hereinafter invention) comprises a plurality of reflectors 101. The plurality of reflectors 101 comprise a collection of individual reflectors 104 that are formed in one or more shapes 102 and that reflect light in a plurality of reflected colors 103.

While the shape and color can vary, each individual reflector 104 selected from the plurality of reflectors 101 has a similar structure. Each individual reflector 104 of the plurality of reflectors 101 comprises a cup 105, a reflective device 107, and a color filter 106.

The cup 105 is the structure that contains the reflective device 107 and the color filter 106. The cup 105 also provides the structure that will allow the invention 100 to be mounted in its final location. The cup 105 is formed with one open end 108 that allows light to enter and leave the structure of the cup 105. In using the term "one or more shapes 102" what is meant is that, at a minimum, the shape of the open end 108 of the cup can vary from individual reflector 104 to individual reflector 104 within the plurality of reflectors 101.

The reflective device 107 is a device that changes the direction of light that shines on it. The reflective device 107 can be a simple mirror or a retroreflective device such as a cube corner reflector or a cat's eye.

The color filter 106 is a filtering medium that absorbs colors that are not within a specific range of wavelengths. The use of the color filters 106 allows the invention 100 to reflect light with a color that is different from the white light that will generally be received by the invention 100. The color filter 106 can be a medium that is inserted between the light source and the reflective device 107 or the color filter 106 can be incorporated directly into the reflective surfaces that are used to create the reflective device 107.

The purpose of the invention 100 is to provide a kit comprising a plurality of reflectors 101 wherein each individual reflector 104 can be individually placed so as to allow the installer to determine the best way to attract the attention and of the targeted viewer and to warn them of the potential danger. Allowing each individual reflector 104 to take a shape and color that is different from other individual reflectors 104 provides potential contrasts that the installer can take advantage of during installation.

In the first potential embodiment of the disclosure, the plurality of reflectors comprises a first reflector 111, a second reflector 121, and a third reflector 131. The one or more shapes 102 are all circular. The plurality of reflected colors 103 comprises a red color, a white color, and a blue color.

The first reflector 111 further comprises a first cup 112, a first color filter 113, a first reflective device 114, a first screw 115 and a first screw hole 116. The first cup 112 is a shell formed in a cylindrical shape with a first open end 117 and a first closed end 118. The first closed end 118 is the cylinder end that is distal from the first open end 117. The first reflective device 114 is a flat circular mirror that is mounted in the first closed end 118 of the first cup 112 such that the reflective surface of the first reflective device 114 faces the first open end 117 of the first cup 112. The first color filter 113 is formed from a transparent circular sheet of plastic that is colored red. The first color filter 113 is mounted on the first reflective device 114 such that the first color filter 113 is between the first reflective device 114 and the first open end 117 of the first cup 112.

The first color filter 113 and the first reflective device 114 are sized so that the diameter 109 of each is less than the diameter 109 of the first cup 112. The first cup 112, first color filter 113 and the first reflective device 114 are each formed with a hole at the center point of their circular shapes. When these center point holes are aligned, a first screw hole 116 is created. The first reflector 111 is installed by screwing the first screw 115 through the first screw hole 116.

The second reflector 121 further comprises a second cup 122, a second color filter 123, a second reflective device 124, a second screw 125 and a second screw hole 126. The second cup 122 is a shell formed in a cylindrical shape with a second open end 127 and a second closed end 128. The second closed end 128 is the cylinder end that is distal from the second open end 127. The second reflective device 124 is a flat circular mirror that is mounted in the second closed end 128 of the second cup 122 such that the reflective surface of the second reflective device 124 faces the second open end 127 of the second cup 122. The second color filter 123 is formed from a transparent circular sheet of plastic. The second color filter 123 is mounted on the second reflective device 124 such that the second color filter 123 is between the second reflective device 124 and the second open end 127 of the second cup 122.

The second color filter 123 and the second reflective device 124 are sized so that the diameter 109 of each is less than the diameter 109 of the second cup 122. The second cup 122, second color filter 123 and the second reflective device 124 are each formed with a hole at the center point of their circular shapes. When these center point holes are aligned, a second screw hole 126 is created. The second reflector 121 is installed by screwing the second screw 125 through the second screw hole 126.

The third reflector 131 further comprises a third cup 132, a third color filter 133, a third reflective device 134, a third screw 135 and a third screw hole 136. The third cup 132 is a shell formed in a cylindrical shape with a third open end 137 and a third closed end 138. The third closed end 138 is the cylinder end that is distal from the third open end 137. The third reflective device 134 is a flat circular mirror that is mounted in the third closed end 138 of the third cup 132 such that the reflective surface of the third reflective device 134 faces the third open end 137 of the third cup 132. The third color filter 133 is formed from a transparent circular sheet of plastic that is colored blue. The third color filter 133 is mounted on the third reflective device 134 such that the third color filter 133 is between the third reflective device 134 and the third open end 137 of the third cup 132.

The third color filter 133 and the third reflective device 134 are sized so that the diameter 109 of each is less than the diameter 109 of the third cup 132. The third cup 132, third color filter 133 and the third reflective device 134 are each formed with a hole at the center point of their circular shapes. When these center point holes are aligned, a third screw hole 136 is created. The third reflector 131 is installed by screwing the third screw 135 through the third screw hole 136.

In the second potential embodiment of the disclosure, the plurality of reflectors comprises a first reflector 111, a second reflector 121, a third reflector 131, a fourth reflector, and a fifth reflector. The one or more shapes 102 are all circular. The plurality of reflected colors 103 comprises a red color, a white color, and a blue color, a yellow color and a green color.

The first reflector 111, the second reflector 121, and the third reflector 131 of the second potential embodiment are identical to the first reflector 111, the second reflector 121, and the third reflector 131 of the first potential embodiment of the disclosure respectively.

The fourth reflector is identical to the first reflector 111 of the first potential embodiment of the disclosure with the following exception: The color filter of the fourth reflector is formed from a transparent circular sheet of plastic that is colored yellow. The fifth reflector is identical to the first reflector 111 of the first potential embodiment of the disclosure with the following exception: The color filter of the fifth reflector is formed from a transparent circular sheet of plastic that is colored green.

In a third potential embodiment of the disclosure, the plurality of reflectors comprises a sixth reflector 141, a seventh reflector 151, and an eighth reflector 161. The one or more shapes 102 comprise a circular shape, a triangular shape and a rectangular shape. The plurality of reflected colors 103 comprises a red color, a blue color, and a yellow color.

The sixth reflector 141 further comprises a sixth cup 142, a sixth reflective device 144, a sixth screw 145 and a sixth screw hole 146. The sixth cup 142 is a shell formed in a cylindrical shape with a sixth open end 147 and a sixth closed end 148. The sixth closed end 148 is the cylinder end that is distal from the sixth open end 147. The circumference of the sixth cup 142 is formed with a sixth tab 149 that projects perpendicularly away from the sixth cup 142. The sixth tab 149 is formed with a sixth screw hole 146. To mount the sixth reflector 141, the sixth screw 145 is inserted into the sixth screw hole 146 and the sixth reflector 141 is screwed into a solid surface. The sixth reflective device 144 is a sixth plurality of cat's eyes 150 that are glued to the sixth closed end 148. Each cat's eyes from sixth plurality of cat's eyes 150 are positioned so that the reflective surface of the cat's eye faces the sixth open end 147 of the sixth cup 142. In lieu of a color medium for the color filter 106, the sixth plurality of cat's eyes 150 are selected so that the light reflected by the sixth plurality of cat's eyes 150 are is in the red wavelengths.

The seventh reflector 151 further comprises a seventh cup 152, a seventh reflective device 154, a seventh screw 155 and a seventh screw hole 156. The seventh cup 152 is a shell formed in a triangular block shape with a seventh open end 157 and a seventh closed end 158. The seventh closed end 158 is the end that is distal from the seventh open end 157. A vertex of the seventh cup 152 is formed with a seventh tab 159 that projects perpendicularly away from the seventh cup 152. The seventh tab 159 is formed with a seventh screw hole 156. To mount the seventh reflector 151, the seventh screw 155 is inserted into the seventh screw hole 156 and the seventh reflector 151 is screwed into a solid surface. The seventh reflective device 154 is a seventh plurality of cat's eyes 160 that are glued to the seventh closed end 158. Each cat's eyes from seventh plurality of cat's eyes 160 are positioned so that the reflective surface of the cat's eye faces the seventh open end 157 of the seventh cup 152. In lieu of a color medium for the color filter 106, the seventh plurality of cat's eyes 160 are selected so that the light reflected by the seventh plurality of cat's eyes 160 are is in the blue wavelengths.

The eighth reflector 161 further comprises an eighth cup 162, an eighth reflective device 164, an eighth screw 165 and an eighth screw hole 166. The eighth cup 162 is a shell formed in a rectangular block shape with a eighth open end 167 and a eighth closed end 168. The eighth closed end 168 is the end that is distal from the eighth open end 167. A vertex of the eighth cup 162 is formed with an eighth tab 169 that projects perpendicularly away from the eighth cup 162. The eighth tab 169 is formed with the eighth screw hole 166. To mount the eighth reflector 161, the eighth screw 165 is inserted into the eighth screw hole 166 and the eighth reflector 161 is screwed into a solid surface. The eighth reflective device 164 is an eighth plurality of cat's eyes 170 that are glued to the eighth closed end 168. Each cat's eyes from eighth plurality of cat's eyes 170 are positioned so that the reflective surface of the cat's eye faces the eighth open end 167 of the eighth cup 162. In lieu of a color medium for the color filter 106, the eighth plurality of cat's eyes 170 are selected so that the light reflected by the seventh plurality of cat's eyes 170 are is in the yellow wavelengths.

To use the invention 100, each of the plurality of reflectors are mounted on a surface selected by the installer.

Each of the cups 102 described in this disclosure can be formed from molded plastic including, but not limited to, polyvinylchloride or polyethylene. Each of the reflective devices described in this disclosure are commercially available. Transparent colored plastics are commercially available.

The following definitions were used in this disclosure:

Cube Corner Reflector: As used in this disclosure, a cube corner reflector comprises three flat mirrors that are each of which are placed at a 90 degree angle to relative to the other two mirrors. This arrangement reflects any captured light on a vector that is parallel to, but in the opposite direction of, the originating light source. The corner cube reflector is a type of retroreflector.

Cat's Eye Reflector: As used in this disclosure, a cat's eye reflector is a glass sphere (or bead) where the rear surface of the sphere is coated in a reflective surface. This arrangement reflects any light entering the front surface of the sphere along a vector that is parallel to, but in the opposite direction of, the originating light source. The cat's eye reflector is a type of retroreflector.

Retroreflector: As used in this disclosure, a retroreflector is a device that reflects light along a vector parallel but opposite to the originating light source.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A reflector kit comprising:
   a plurality of reflectors;
   wherein the plurality of reflectors further comprise a collection of individual reflectors that are formed in one or more shapes;
   wherein each individual reflector reflects light in a color selected from a plurality of reflected colors;
   wherein each individual reflector can be individually placed so as to allow the installer to determine the best way to attract the attention and of the targeted viewer;
   wherein each individual reflector selected from the plurality of reflectors comprises a cup, a reflective device, and a color filter;
   wherein the cup contains the reflective device;
   wherein the cup contains the color filter.

2. The reflector kit according to claim wherein the cup is formed with one open end.

3. The reflector kit according to claim 2 wherein the reflective device is a device that changes the direction of light that shines on it.

4. The reflector kit according to claim 3 wherein the reflective device is a retro-reflective device.

5. The reflector kit according to claim 3 wherein the color filter is a filtering medium that absorbs colors, which are not within a specific range of wavelengths.

6. The reflector kit according to claim 5 wherein
   the plurality of reflectors comprises a first reflector, a second reflector, and a third reflector;
   wherein the plurality of reflected colors comprises a red color, a white color, and a blue color.

7. The reflector kit according to claim 5 wherein the plurality of reflectors comprises a sixth reflector, a seventh reflector, and an eighth reflector.

8. The reflector kit according to claim 7 wherein the one or more shapes comprise a circular shape, a triangular shape and a rectangular shape.

9. The reflector kit according to claim 8 wherein plurality of reflected colors comprises a red color, a blue color, and a yellow color.

10. The reflector kit according to claim 9 wherein
    the sixth reflector further comprises a sixth cup and a sixth reflective device;
    wherein the seventh reflector further comprises a seventh cup and a seventh reflective device;
    wherein the eighth reflector further comprises a eighth cup and a eighth reflective device.

11. The reflector kit according to claim 10 wherein the sixth cup is a shell formed in a cylindrical shape;
    wherein the seventh cup is a shell formed in a triangular block shape;
    wherein the eighth cup is a shell formed in a rectangular block shape.

12. The reflector kit according to claim 11 wherein
    the sixth reflective device incorporates a red color filter;
    wherein the seventh reflective device incorporates a blue color filter;

wherein the eighth reflective device incorporates a yellow color filter.

13. The reflector kit according to claim 12 wherein the sixth reflective device is a retro-reflector;

wherein the seventh reflective device is a retro-reflector;

wherein the eighth reflective device is a retro-reflector.

14. The reflector kit according to claim 13 wherein the sixth reflective device is a cat's eye;

wherein the seventh reflective device is a cat's eye;

wherein the eighth reflective device is a cat's eye.

\* \* \* \* \*